(12) United States Patent
Rodella (10) Patent No.: US 10,464,720 B2
(45) Date of Patent: Nov. 5, 2019

(54) CORK AND PAPERBOARD BEVERAGE-PACKAGING CONTAINER

(71) Applicant: GreenOne Bottling, LLC, Las Vegas, NV (US)

(72) Inventor: Kristina Rodella, Las Vegas, NV (US)

(73) Assignee: GREENONE BOTTLING, LLC, Las Vegas, NV (US)

( * ) Notice: Subject to any disclaimer, the term of this patent is extended or adjusted under 35 U.S.C. 154(b) by 189 days.

(21) Appl. No.: 15/586,138

(22) Filed: May 3, 2017

(65) Prior Publication Data

US 2017/0233147 A1 Aug. 17, 2017

Related U.S. Application Data

(63) Continuation-in-part of application No. PCT/US2015/059604, filed on Nov. 6, 2015.

(Continued)

(51) Int. Cl.
*B65D 25/34* (2006.01)
*B65D 39/00* (2006.01)
(Continued)

(52) U.S. Cl.
CPC ............ *B65D 39/0011* (2013.01); *B32B 5/16* (2013.01); *B32B 9/02* (2013.01); *B32B 9/06* (2013.01); *B32B 29/005* (2013.01); *B32B 29/04* (2013.01); *B65D 1/02* (2013.01); *B65D 3/02* (2013.01); *B65D 5/029* (2013.01); *B65D 15/04* (2013.01); *B65D 23/02* (2013.01); *B65D 39/0058* (2013.01); *B65D 39/16* (2013.01); *B65D 51/18* (2013.01); *B65D 65/466* (2013.01); *B65D 85/72* (2013.01); *B32B 2260/025* (2013.01); *B32B 2260/046* (2013.01); *B32B 2264/06* (2013.01); *B32B 2439/70* (2013.01);
(Continued)

(58) Field of Classification Search
CPC . B65D 5/40; B65D 5/727; B65D 5/12; B65D 5/14; B65D 5/566; B65D 85/72; B65D 15/04; B65D 2251/0093
See application file for complete search history.

(56) References Cited

U.S. PATENT DOCUMENTS 4,604,850 A   8/1986 Reil
5,738,921 A   4/1998 Anderson et al.
(Continued)

FOREIGN PATENT DOCUMENTS

CN   203470016   3/2014
EP   2451644 B1   6/2010
WO   99/55588   11/1999

*Primary Examiner* — Stephen J Castellano
(74) *Attorney, Agent, or Firm* — Connie R. Masters (57) ABSTRACT

A beverage-packaging container is provided that includes a container body for receiving the liquid and a cork stopper for sealing the liquid contents within the container body. The sidewalls and bottom wall of the container body are formed of paperboard and are preferably formed of a layered, recycled paperboard. The top wall of the container body is formed of a cork material with a cork-receiving hole disposed within the top wall. The cork stopper has a truncated cone-shaped portion that is configured to engage frictionally with the edges of the cork-receiving hole. The cork stopper may also have a wooden crown to aid the user in grasping and removing the cork stopper from the top hole of the container body.

15 Claims, 4 Drawing Sheets

Related U.S. Application Data (60) Provisional application No. 62/076,449, filed on Nov. 6, 2014.

(51) Int. Cl.
| | | |
|---|---|---|
| *B65D 1/02* | (2006.01) | |
| *B65D 8/00* | (2006.01) | |
| *B65D 3/02* | (2006.01) | |
| *B65D 39/16* | (2006.01) | |
| *B65D 51/18* | (2006.01) | |
| *B32B 5/16* | (2006.01) | |
| *B32B 9/02* | (2006.01) | |
| *B32B 9/06* | (2006.01) | |
| *B32B 29/00* | (2006.01) | |
| *B32B 29/04* | (2006.01) | |
| *B65D 5/02* | (2006.01) | |
| *B65D 23/02* | (2006.01) | |
| *B65D 65/46* | (2006.01) | |
| *B65D 85/72* | (2006.01) | |

(52) U.S. Cl.
CPC ............ *B65D 2101/0023* (2013.01); *B65D 2251/0012* (2013.01); *B65D 2251/0093* (2013.01)

(56) References Cited

U.S. PATENT DOCUMENTS

| | | | |
|---|---|---|---|
| 6,287,247 | B1 | 9/2001 | Dees et al. |
| 6,505,769 | B2 | 1/2003 | Stone |
| 6,710,135 | B2 | 3/2004 | Tan et al. |
| 6,756,331 | B2 | 6/2004 | Kasemura et al. |
| 7,825,212 | B2 | 11/2010 | Ouchi et al. |
| 7,854,994 | B2 | 12/2010 | Henderson-Rutgers et al. |
| 2004/0105941 | A1 | 6/2004 | Terada et al. |
| 2005/0199696 | A1* | 9/2005 | MacConkey .......... B65D 5/029 229/249 |
| 2006/0043055 | A1 | 3/2006 | Wang |
| 2007/0215618 | A1 | 9/2007 | Wright et al. |
| 2010/0252617 | A1 | 10/2010 | Dayton et al. |
| 2012/0273503 | A1* | 11/2012 | Yen .................. A47J 43/27 220/568 |
| 2013/0233912 | A1 | 9/2013 | Piotrowski |

\* cited by examiner

CORK AND PAPERBOARD
BEVERAGE-PACKAGING CONTAINER

CROSS-REFERENCE TO RELATED
APPLICATIONS

The present application is a bypass continuation-in-part application of currently pending international application No. PCT/US2015/059604 having an international filing date of Nov. 6, 2015 and designating the United States, the international application claiming a priority date of Nov. 6, 2014 based upon prior-filed U.S. provisional patent application No. 62/076,449, the entire contents of the aforesaid international application and the aforesaid United States provisional patent being incorporated herein by reference.

FIELD OF INVENTION

This invention relates generally to beverage-packaging containers, and, more particularly, to a container for packaging beverages for consumers that is formed of paperboard integrated with a cork top.

BACKGROUND OF THE INVENTION

Disposable individual serving beverage containers provide portability and convenience. Though they must be inexpensive to manufacture so as not to add unduly to the cost of the contained beverage, they must also satisfy a number of physical, structural and aesthetic criteria to meet packaging and shipping requirements and various consumer desires. When empty, it is desirable that disposable beverage containers can be recycled or repurposed. Additionally, consumers have a strong preference for natural products, particularly for containers that hold edible foods or beverages.

Several types of disposable beverage containers are conventionally available, each of which has advantages and disadvantages. These include plastic bottles, aluminum cans, glass bottles, and laminated paper beverage containers.

Plastic bottles are inexpensive and transparent, plus they provide a good gas and moisture barrier and do not break. However, plastic bottles are made from non-renewable petroleum, the extraction of which is environmentally damaging. In addition, the manufacturing of the bottles is very energy intensive. Plastic bottles are recyclable, but not biodegradable. It has been shown that 75-80% of these bottles end up as solid waste in landfills in the United States.

Aluminum cans are quite common, but costs are high for the extraction of the bauxite (required in the production of the aluminum) and the manufacturing of the cans. Additionally, manufacturing uses large amounts of energy and produces a variety of pollutants. Consumers may dislike aluminum cans because the cans cannot be resealed after opening, the aluminum may impart a taste to the contained product, and there may be a fear of leaching of the aluminum into the contained product.

Glass beverage bottles, which are beloved by many, provide transparency and good chemical stability, so do not impart a taste to the enclosed product. Glass is made of more plentiful materials (mainly sand and silica) than the petroleum used in plastic bottles or the bauxite used in aluminum cans, and these materials, though non-renewable, are less environmentally damaging to extract. However, glass bottles are much more expensive to transport due to both the fragility of glass (better packaging is required) and particularly due to the weight of glass—a glass bottle weighs from ten to over twenty times more than an aluminum can or a plastic bottle. A 2005 German study showed that the manufacturing and distribution of glass bottles used twice the amount of energy used in the manufacturing and distribution of plastic bottles.

Paperboard beverage containers are generally formed of multiple layers, with a layer of paper (about 75%), with one or more thin layers of polyethylene (about 20%), and with a one or more layers of aluminum foil (about 5%); thus, they are manufactured primarily from renewable forest resources. The Boston-based Tellus Institute for the U.S. Environmental Protection Agency reported in a study in the early 1990's that paperboard beverage containers have the lowest environmental impact of any beverage container. Their lighter weight, unbreakable material and squared-off shape allow efficient and less costly transportation. Paperboard beverage containers are recyclable. However, consumers have a strong preference for a beverage container that increases the use of natural products.

Though several different types of beverage container have been developed and each may meet the needs of some applications, each type has disadvantages. Additionally, there are commercial advantages to a novel container that attracts the attention of consumers, who may preferentially purchase the contained product due to the novelty of the container.

Accordingly, there is a need for a beverage container that may encourage sales of the contained product due to novelty of the container and that utilizes a larger percentage of natural cork materials than other beverage containers.

BRIEF SUMMARY OF THE INVENTION

The present invention is directed to a packaging receptacle for liquid contents. This packaging receptacle may contain any of a variety of liquid contents, but is particularly suited for containing beverages. The packaging receptacle (termed herein the "beverage-packaging container") includes a cork and paperboard container body and preferably also includes a cork stopper.

The container body includes a bottom wall, a top wall, and four sidewalls (a first sidewall, a front wall, a second sidewall, a back wall). The top wall is formed at least partially of a cork material and is configured with a circular stopper-receiving hole edge that defines a top stopper-receiving hole that is sized and configured to accommodate the cork stopper. The cork stopper includes at least one truncated cone-shaped portion formed of a cork material. In the first embodiment, the bottom wall may be formed of one piece of layered paperboard, which is joined to the sidewalls that are formed of a separate single piece of layered paperboard. In the third embodiment, the sidewalls and bottom walls are formed of a single piece of layered paperboard that is folded to create that bottom wall, as is known in the art. In various aspects of the invention, the layered paperboard may include multiple layers of paper, may include one or more layers of paperboard and one or more layers of bioplastic, or may include one or more layers of paperboard and one or more layers of cork.

In one aspect of the invention, the cork stopper includes both the lower truncated cone-shaped cork portion and an upwardly-protruding cap or crown attached to the top surface of the truncated cone-shaped portion.

In a second aspect of the invention, the upwardly-protruding crown is formed of wood.

In a third aspect of the invention, the upwardly-protruding crown is formed of plastic.

In a fourth aspect of the invention, the upwardly-protruding crown is formed of extruded or agglomerated cork.

In a further aspect, at least one of the layers of the layered paperboard of the sidewalls and bottom is recycled paperboard.

In another aspect of the invention, a specific type of recycled paperboard is used, which is Caraustar® paperboard.

In an additional aspect of the invention, the layered paperboard includes at least three layers: an inner layer, a middle layer, and an exterior layer.

In yet another aspect of the invention, the layered paperboard of any or all of the inner layer, middle layer, and/or exterior layer may be formed of recycled paperboard.

In an additional aspect of the invention, the inner layer may be formed of cork.

In a further aspect of the invention, the layered paperboard includes an outer layer of paperboard and an inner layer of bioplastic.

In another aspect of the invention, an outer layer or sleeve may be formed of cork to enhance the visual appeal.

In an additional aspect of the invention, a cork band may partially or fully cover the outer layer of paperboard.

In a further aspect of the invention, the sidewalls are joined at a vertical sealed side seam.

In another aspect of the invention, at least one of the vertical sealed side seam, the top seam (formed at the intersection of the top wall and the single piece of layered paperboard of the sidewalls), or any bottom seam (formed at the intersection of the bottom wall and the sidewalls or formed at the intersection of the edges of the bottom folded portion of a single piece of layered paperboard) is coated with a seam compound of a copolymer material or a similar polychloroprene material.

In a further aspect of the invention, at least one of the vertical sealed side seam, the top seam, or any bottom seam is coated with a seam compound of a DuPont™ Neoprene polychloroprene material or a similar polychloroprene material.

In another aspect of the invention, at least one of the vertical sealed side seam, the top seam, or any bottom seam is coated with a mixture of a copolymer material and of DuPont™ Neoprene polychloroprene material or a similar polychloroprene material.

In an additional aspect of the invention, at least one of the vertical sealed side seam, the top seam, or any bottom seam is coated with a seam compound of a cork.

The beverage container of the present invention provides a novel packaging that will attract consumer attention on the store shelves due to the inclusion of natural cork in at least the top wall and, preferably, in the cork stopper. Additionally, the usage of renewable cork provides an environmental advantage.

These and other objects, features and advantages of the present invention will become more readily apparent from the attached drawings and from the detailed description of the preferred embodiments that follow.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements.

Like reference numerals refer to like parts throughout the several views of the drawings.

DETAILED DESCRIPTION OF THE INVENTION

Shown throughout the figures, the present invention is directed toward a packaging receptacle for liquid contents formed substantially of paperboard and cork. This packaging receptacle can be utilized to contain a variety of liquid food and beverage products, such as soup, yogurt, water, milk, alcoholic drinks, flavored drinks, coconut water, baby food, salad dressing, salsa, fruit juices and the like. However, it is particularly suitable for containing beverages and is generally referred to herein as a "beverage-packaging container."

The beverage-packaging container 10 of the present invention provides an innovative look while increasing the usage of natural cork material. Environmentally aware consumers will appreciate the usage of renewable cork material and the preferable use of recycled paperboard. These attributes of the beverage-packaging container reflect positively on consumer perceptions and lead to an increase in purchasing of the contained product in the enhanced packaging.

Figure 1:
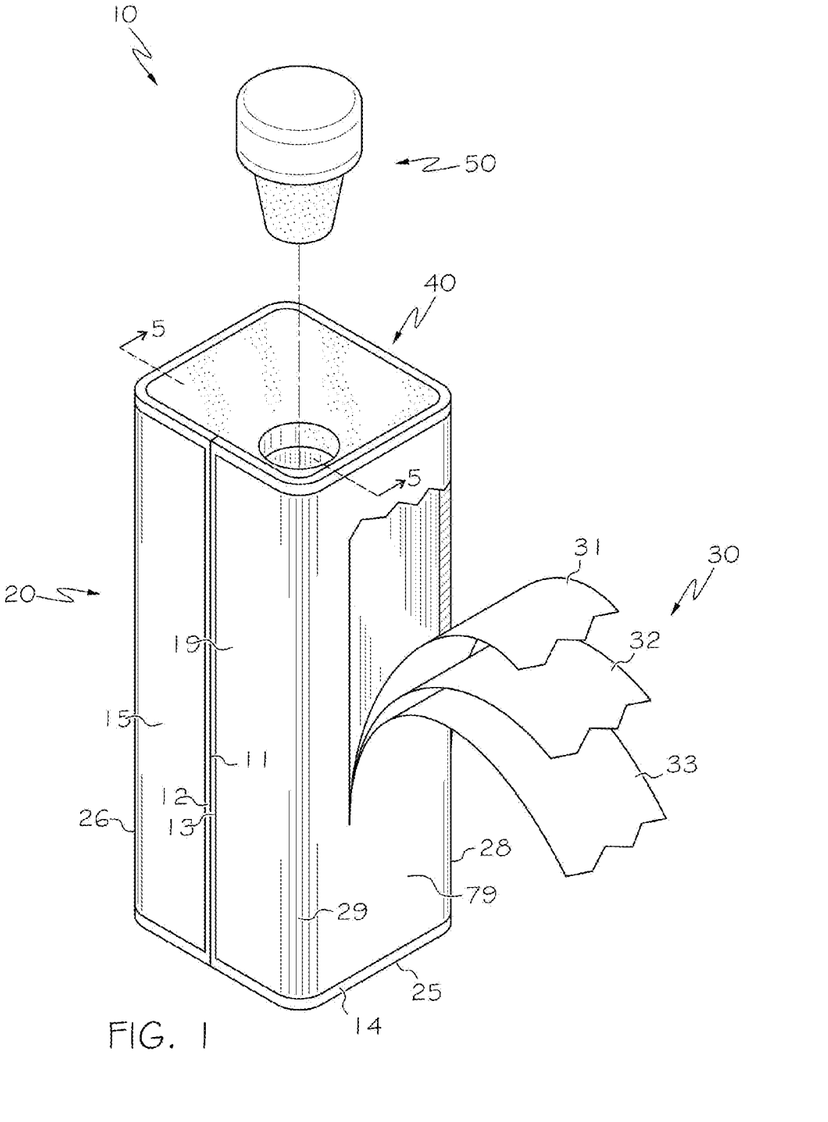
FIG. 1 is a perspective view of a container body and a cork stopper of the first embodiment of the cork and paperboard beverage-packaging container of the present invention.

Referring now to FIG. 1, the beverage-packaging container, shown generally as reference number 10, is illustrated in accordance with a preferred embodiment of the present invention. As shown, the beverage-packaging container 10 includes two main parts, a container body 20 and a cork stopper 50.

The container body 20 may be formed by conventional means of any standard materials, as are known or become known in the art. For example, in the first embodiment, the container body 20 includes a top wall 40, a bottom wall (not seen in the first embodiment, but element number 70 on FIG. 8 of the second embodiment) that opposes the top wall 40, and four sidewalls, which include a front wall 18, a first (or left) sidewall 15, 19, a second sidewall (not seen) opposing the first sidewall 15, 19, and a back wall (not seen) opposing the front wall 18. The four sidewalls and the bottom wall are formed of a layered paperboard material 30, while the top wall 40 is formed of a cork material. In this first embodiment, the four sidewalls are formed of a single piece of layered paperboard 30. The opposing ends of the single piece of layered paperboard 30 are permanently joined at sealing band termed "side seam 11" to form a closed shape and bent with vertical bends, which may be rounded bends, as shown in FIG. 1, or more angled bends. The vertical bends include the first side-back junction bend 26, the first side-front junction bend 29, the second side-front junction bend 28 and the second side-back junction bend (not seen).

The side seam 11, formed when the opposing ends of the single piece of layered paperboard 30 meet and are permanently affixed to one another, may optionally be located on one of the vertical bends, but for strength, the side seam 11 is preferably disposed at a central location on one of the four sidewalls. In FIG. 1, side seam 11 is shown as disposed approximately in the center of the first sidewall; therefore, the first sidewall 15, 19 includes left first sidewall 15 and right first sidewall 19. Side seam 11 may be formed using standard methods for joining laminated paperboard containers, as is known or becomes known in the art, such as joining by heat sealing, adhesive, or other standard joining means.

Optionally, in addition to the standard joining method, side seam 11 may be over-sealed with a seam compound 12, 13 applied over the exterior of side seam 11 and to the exterior sides of side seam 11. The seam compound may be formed of a plastic resin or a copolymer, which may be optionally combined with particulates of cork material, with a synthetic rubber, or with DuPont™ Neoprene polychloroprene or a similar polychloroprene material, or wax. Preferably, a copolymer combined with cork particles or an agglomerated or extruded cork material is used for the over-sealing.

The bottom wall 70 of the first embodiment is preferably formed of a single piece of layered paperboard 30. The bottom wall corresponds to the shape of top wall 40; it may be preferably a square shape with rounded corners. The bottom wall is permanently affixed, in a similar manner to the side seam, at a sealing band alongside-bottom edge seam 25 to the bottom edge of the front wall 18, to the bottom edge of the first sidewall 15, 19, to the bottom edge of the second sidewall opposing the first sidewall 15, 19, and to the bottom edge of the back wall (not seen). The side-bottom edge seam 25 is formed similarly to the side seam 11 by use of an industry-standard joining method and is reinforced or decorated with a seam compound 14 of the same type as seam compound 12, 13.

The paperboard 30 used to form the bottom wall and side walls is formed of at least two layers, an inner layer 31 and an exterior layer 33, but is preferably formed of three or more layers, the inner layer 31, a middle layer 32 or middle layers 32, and the exterior layer 33. In one aspect the inner layer 31 (or inner layer and middle layer(s) 32) are formed of a recycled, unbleached paperboard, such as Caraustar® paperboard. In other aspects, a thin layer of natural cork, polyethylene, aluminum, or bioplastic may be used for the inner layer 31. The outer layer 33 may also be formed of paperboard, recycled paperboard, a cork material combined with paperboard, or may be formed of a thin cork layer. The outer layer 33 is designed to provide structural stability. Optionally, the layers may include thin layers of polyethylene and aluminum foil. The usage of 100% recycled paperboard, such as is formed of fiber collected by pulping, cleaning, screening, foaming, drying and/or welding, is preferred for at least one layer.

In the aspect in which bioplastic is used, the bioplastic is derived from renewable sources and is preferably biodegradable. Bioplastics may be made from vegetable oils, starches, biopolymers, proteins, and other biomass sources, such as corn, potatoes, tapioca, rice, palm fiber, cellulose, plant dextrose, wheat fiber, bagasse, and agricultural byproducts. Currently, polylactic acid produced from dextrose or corn is preferred due to the similarity between its characteristics and the characteristics of conventional petrochemical-based mass plastics, which allows the usage of some standard processing equipment.

Figure 3:
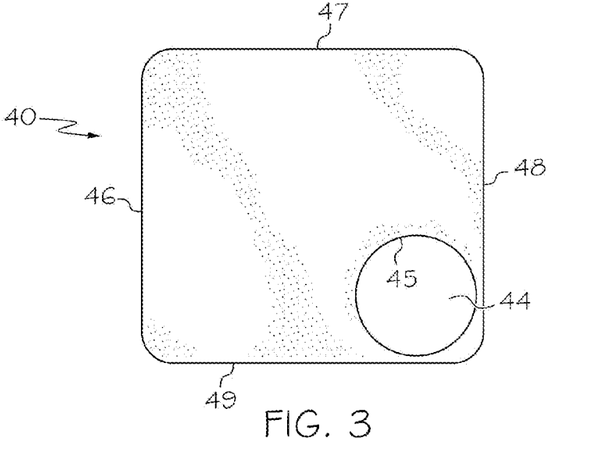
FIG. 3 is a top view of the cork top wall of the container body of the first embodiment of the beverage-packaging container of the present invention.
Figure 6:
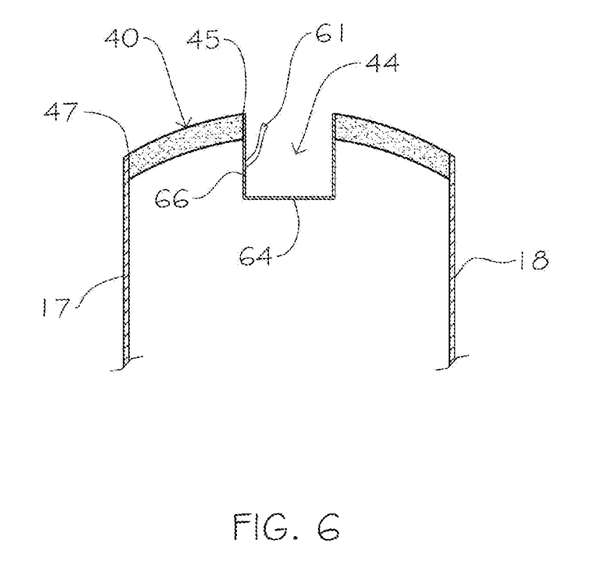
FIG. 6 is a cut view of the same portion of the container body shown in FIG. 5, but shows a second embodiment with a rounded cork top wall.

The inventive top wall 40 is formed of a cork material. Though multiple pieces of cork material may be joined together to form a patched top wall 40, preferably a single piece of cork material forms a unitary top wall 40. As seen in FIG. 3, the top wall 40 is preferably substantially flat, or it may be peaked or rounded in the common shape of plastic beverage containers, as shown in FIG. 6. To create the peaked or rounded neck, the cork material of top wall 40 may be molded, pressure molded, extruded into a mold, or otherwise shaped, as is known or becomes known in the art.

The top wall 40 extends from edge 47 to opposing edge 49 and from left edge 46 to opposing right edge 48. These top wall edges 46, 47, 48, 49 are permanently affixed to the top edges of the sidewalls.

The top wall 40 is configured with a circular stopper-receiving hole edge 45 that defines a top stopper-receiving hole 44. The stopper-receiving hole 44 may be centrally disposed (as shown in FIG. 6), but is preferably disposed toward one corner of top wall 40, as shown in FIGS. 1, 3. The stopper-receiving hole 44 has a diameter that corresponds to the diameter of a mid-portion of the cork stopper 50, so as to allow the cork stopper 50 to frictionally engage the hole edge 45 to form a seal. Preferably, the hole edge 45 is created by removing a cylindrical portion of the cork material, so that the outside edges of the cork material of stopper 50 engage with the cork hole edge 45. Optionally, if needed for strength or if needed to reduce frictional engagement between the cork top wall 40 and the cork stopper 50, hole edge 45 may be lined with a separate material, such as a portion of the membrane 64. Another optional feature is the addition of threads 43 to the interior of receiving hole edge 45 with the corresponding introduction of stopper threads 53 to the exterior side 54 of cork stopper 50, which allows the consumer to twist off the cork stopper 50. The cork stopper 50 may be cut or shaped to create the stopper threads 53 or, optionally, another material may be attached to the exterior side 54. For example, a heated plastic resin may be adhered to the sides in a thread pattern corresponding to the thread pattern of the receiving hole edge 45.

The cork top wall 40 may be natural cork or, due to cost considerations, may preferably be agglomerated or extruded cork.

If agglomerated or extruded cork is used, the top wall may be formed of a natural or man-made rubber mixed with cork particles or a polyethylene or another resin mixed with cork particles. The melted cork/resin mixture is injected at high pressure and temperature into liquid-cooled modes that trap the top edges of the sidewalls. For example, polyethylene chunks may be heated with cork particles to form a slurry that can be extruded or injected into a mold adjacent to or somewhat overlapping the top edges 46, 47, 48, 49 of the sidewalls. If polyethylene is used in the layered construction of the sidewalls, the high temperature of the melted cork activates the polyethylene. As the melted cork/resin mixture cools due to contact with the liquid-cooled molds, the polyethylene of the layered construction also cools, and the cork is thus securely affixed to the top edges of the sidewalls. Thus, when cool and hardened, this extruded top wall 40 is permanently attached to the container body 20. The polyethylene used may be newly manufactured or may be from clear polyethylene terephthalate (PET), such as water bottles, that has been recycled into flakes or pellets for use in manufacture of new food grade beverage containers.

Optionally, the top wall may be formed of a piece of natural cork with the edges adhesively attached or otherwise fixedly adhered to the top edges 46, 47, 48, 49 of the sidewalls. Whether the top wall is formed of natural cork or of agglomerated or extruded cork, in some aspects, a thin underlayment 41 may be added, such as an aluminum foil layer, paperboard layer, or bioplastic, if design specifications or requirements necessitate it.

Figure 5:
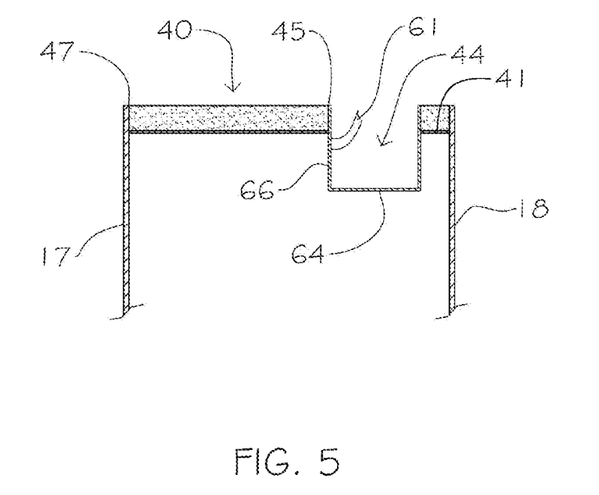
FIG. 5 is a cut view, taken along lines 5-5 of FIG. 1, of a portion of the container body of the paperboard beverage-packaging container of FIG. 1.

Preferably a membrane 64, as seen in the cut views of FIGS. 5-6, is adhered to the cork hole edge 45 and may extend to the cork hole edge 45, extend beyond the cork hole edge 45 a distance toward the sidewall top edges 46, 47, 48, 49, or extend to the sidewall top edges 46, 47, 48, 49. The membrane 64 provides a seal against air and contamination of the contained beverage. A pull tab 61 is connected to the membrane 64 to allow the consumer to easily remove the membrane 64. The pull tab 61 is preferably firmly anchored to a tear strip portion of membrane 64. The membrane 64 may be reinforced at the area of attachment 66 of the pull tab 61 to prevent accidental rupture of the membrane 64. The tear strip of membrane 64 may be an area that is indented, partially cut, weakened, notched, or perforated (termed "scored" herein). This scored tear strip may be at the top of the cork hole edge 45 where the membrane joins the edge 45 or may preferably be an area below the cork hole edge 45. The scoring below the level of the cork hole edge 45 allows an upper portion of the membrane 64 to remain adhered to the cork hole edge 45, when pull tab 61 is manually removed. Having this upper portion of the membrane 64 remain may be desirable to reduce friction between the cork stopper and the cork hole edge 45.

Figure 2:
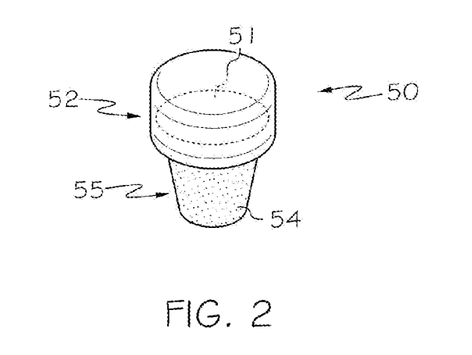
FIG. 2 is a perspective view of a first variation of the cork stopper usable with any embodiment of the beverage-packaging container of the present invention.
Figure 4:
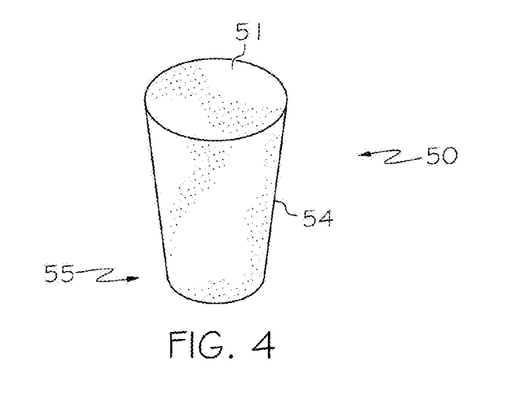
FIG. 4 is a perspective view of a second variation of the cork stopper usable with any embodiment of the beverage-packaging container of the present invention.

The cork stopper 50 includes at least one truncated cone-shaped portion 55 (FIG. 2) formed of a cork material. However, in the first embodiment as seen in FIGS. 1-2, the stopper 50 additionally includes an upwardly-protruding crown 52 (FIG. 2) permanently attached to the top surface 51 (FIG. 4) of the truncated cone-shaped portion. The upwardly-protruding crown 52 is preferably formed of wood to enhance the natural look and feel of the beverage-packaging container 10; however, other materials, such as plastic, rubber, bamboo, laminated wood, cork or metal, are within the scope of the invention. The upwardly-protruding crown 52 serves to aid in grasping the cork stopper 50 and does not interface with hole edge 45; instead, the truncated cone-shaped portion 55 interfaces with the hole edge 45 to form a seal. Therefore, the upwardly-protruding crown 52 may be formed in any desired decorative shape, such as the cylindrical shape shown in FIGS. 1, 2, another geometric shape, a free-form shape, or any other creative or interesting shape that allows a user to grasp the crown 52 for ease of extraction of cork stopper 50. An external sealing material may be optionally used to further seal the cork stopper 50 within the stopper-receiving hole 44.

To construct the beverage-packaging container 10 of the first embodiment, the piece of layered paperboard that will form the sidewalls and bottom is bent to form a three-dimensional sleeve-shape, which may as a cross section an oval, square, rectangle, square or the like, and is sealed at side seam 11 (FIG. 1). As a first option, the bottom wall of layered paperboard is first permanently attached at the bottom open end of the three-dimensional sleeve-shape. The beverage container is filled and the top wall 40 of cork with the attached membrane 64 configured with a pull tab 61 (FIGS. 5-6) is adhered to the cork hole edge 45. Optionally, the top wall 40 may be injected into liquid-cooled molds and securely adhered to the top open edges of the layered sleeve; the container is filled through the stopper-receiving hole 44, and then the membrane is then affixed to seal the contents. In a second preferable option, the top wall 40 with membrane 64 sealing the stopper-receiving hole 44 is first attached, as described above, to the top edges of the sidewalls of the three-dimensional sleeve-shape; the beverage-packaging container 10 is inverted and filled; and the bottom wall of layered paperboard is attached last. In a further aspect, the membrane 64 may underlie the entire top wall 40, as well as being disposed at the stopper-receiving hole 44 and providing a seal under the cork stopper 50.

A second embodiment of the beverage-packaging container 10 is illustrated in FIG. 6, which provides a centrally disposed stopper-receiving hole 44 and a peaked or rounded top wall 40. The peaked top wall 40 provides an alternative look and allows placement of the stopper-receiving hole 44 at the peak of the mounded portion.

Figures 7, 8:
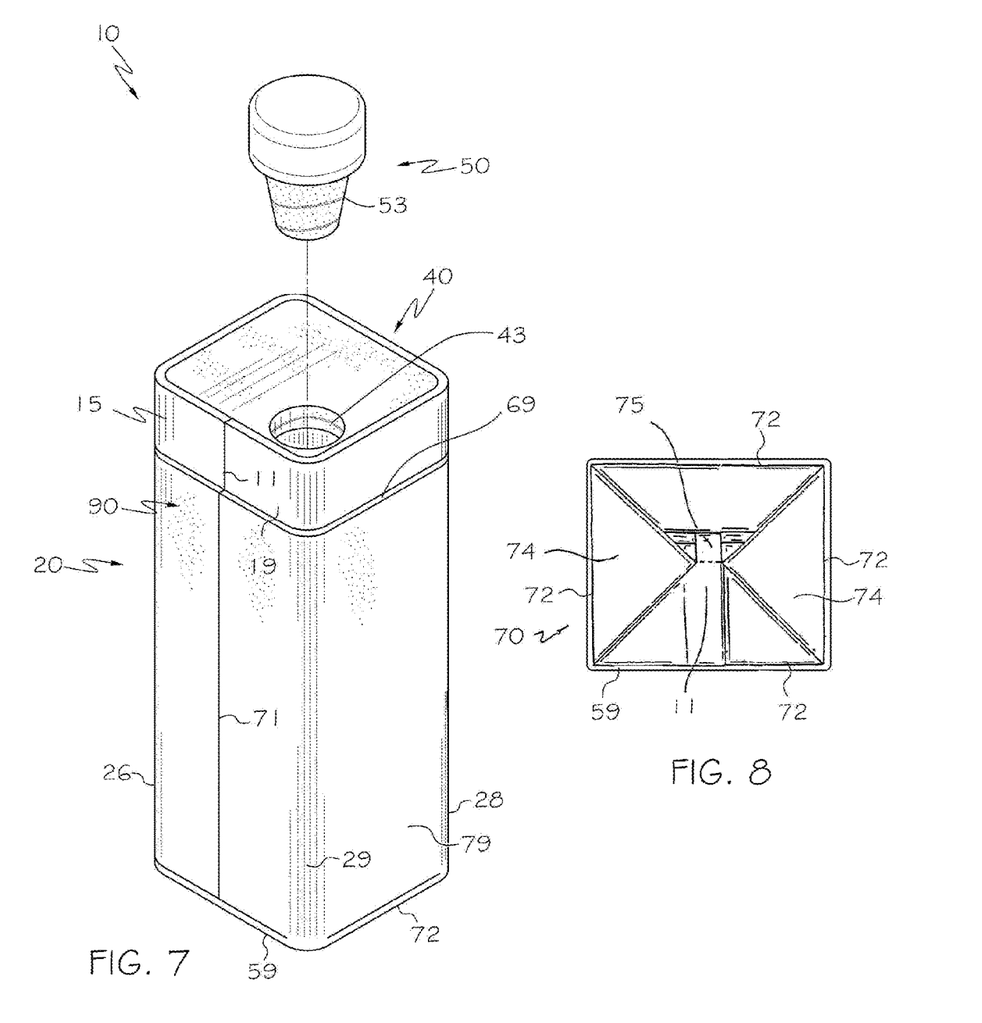
FIG. 7 is a perspective view of a third embodiment of cork and paperboard beverage-packaging container of the present invention showing the container body and cork stopper.
FIG. 8 is a bottom view of the container body of the third embodiment of FIG. 7.

Turning to FIGS. 7-8, the third embodiment is shown, which is similar to the first embodiment, but illustrates optional variations in the stopper threads 53 for threading engagement with the top wall threads 43, a variation in that the container body 20 is formed of a single piece of paperboard, and an addition of a full or partial outer cork band 90 on the exterior of the sidewalls. In this embodiment, the cork hole edge 45 is configured with optional inner threads 43 that correspond to the complementary outer threads 53, with which the lower portion of the cork stopper 50 is configured.

The single piece of paperboard is sealed at a side seam 11 and at a bottom seam 75, and the bottom extensions of the sidewalls are folded at the substantially ninety-degree bend 72 (FIGS. 7-8) at the bottom of the vertical portions of the sidewalls to create a generally flat, horizontal bottom for the container. The sidewall that includes the sealing band or side seam 11 (the front wall in the illustration) extends beyond the bend 72 and terminates at the bottom seal structure 75. Two opposing bent extensions of the sidewalls define respective flat, substantially triangular bottom portions 74 (FIG. 8) of layered paperboard material folded generally coplanar with and onto the folded horizontal sections of the other walls. Note that the ninety-degree bend 72 at the bottom of the four vertical walls in this embodiment replaces the side bottom edge seam 25 of the first embodiment.

An outer cork band 90 is a layer or cover of thin cork wrapped around the outside of the container to meet at cork seam 71. It fully or partially covers the sidewalls and extends from a cork top edge 69 to a cork bottom edge 59. It may extend from a cork bottom edge 59 at or near the bottom folds 72 to a cork top edge 69 at or near the top edges of the sidewalls; or it may extend from the bottom folds 72 to an area somewhat below the top edges of the sidewalls, as illustrated in FIG. 7; or it may extend from an area above the bottom folds 72 (such as at area 79) to an area below the top edges of the sidewalls; or it may extend from an area above the bottom folds 72 to the top edges of the sidewalls. It may have a thickness of from about $\frac{1}{32}$ inch to $\frac{1}{2}$ inch. The cork band 90 is permanently affixed, such as by adhesive, to the exterior of the sidewalls. The cork band may be appealing to consumers due to the natural look and due to the insulation properties it provides.

To construct the beverage-packaging container 10 of the second embodiment, the sidewall piece of layered paperboard is bent to form an open sleeve (which may have a circular, oval, rectangular, the illustrated square cross-section, or other similar shape) and is sealed at side seam 11

(FIG. 1) and at a bottom seam 75. Then the top wall 40 is injected into a liquid-cooled mold and securely adhered to the top open edges of the layered sleeve. The membrane 64 is then affixed to seal the hole in the top wall 40. The beverage-packaging container 10 is turned bottom side up and filled from the bottom. Then the container is inverted and the bottom portions of each sidewall of the open sleeve are bent to form the triangular bottom portions 74, and the bottom is sealed. The beverage-packaging container 10 is again inverted so the top side is up to be packaged in an exterior shipping box.

The beverage-packaging container 10 can be used for shelf-stable packaging or for refrigerated packaging. In aseptic filling of the beverage-packaging container 10, the product is sanitized and sterilized, generally with a heat application before the product is introduced into the sterilized beverage-packaging container 10.

Separately, the cork stopper 50 is formed. In the first stopper variation, this is done by permanently attaching the upwardly-protruding crown 52 to the top surface 51 of the truncated cone-shaped portion 55 (FIG. 2). In the second stopper variation, the truncated cone-shaped portion 55 (FIG. 4) may be utilized without further attachments. In the third stopper variation of FIG. 7, the truncated cone-shaped portion is configured with threads 53. Any printing on the beverage-packaging container 10 or cork stopper 50 is preferably done with vegetable and soy ink.

Before packing in an exterior shipping box, the unthreaded cork stopper 50 may be frictionally engaged with the stopper-receiving hole edge 45, or the threaded stopper 50 may be twisted to engage with the threads 53 of the stopper-receiving hole edge 45. A grouping of the beverage-packaging containers 10 is then placed in a shipping box for transport to the distribution center or retail store.

After purchase, the user removes the cork stopper 50 and pulls on pull tab 61 to remove at least some of the membrane 64 to consume the enclosed beverage. The entire membrane may be removed in this step, or the membrane 64 may be partially removed with an edge-lining portion remaining at the stopper-receiving hole edge 45 or with an underlayment 41 remaining lining the underside of the cork top wall 40. After consumption of the beverage, the cork stopper 50, the cork top wall 40, and the cork band 90 (if present) may then be repurposed to create handmade art or handcrafted items, such as picture frames, pincushions, mixed media art, bulletin boards or the like. Both the paperboard and the cork are also recyclable.

The invention illustratively disclosed herein may be suitably practiced in the absence of any element that is not specifically disclosed herein.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A packaging receptacle for liquid contents comprising:
   a container body having an interior surface and an exterior surface, said container body comprising a bottom wall, a first sidewall, a front wall, a second sidewall, a back wall, and a top wall, wherein:
      said first sidewall, said front wall, said second sidewall, said back wall, and said bottom wall are formed of layered paperboard; wherein said layered paperboard comprises at least an inner and outer layer; and
      wherein said first sidewall, said front wall, said second sidewall, said back wall, and said bottom wall are formed of a single piece of layered paperboard joined at a vertical side seam and at a bottom seam;
      said top wall is formed of a top wall cork material; wherein the top wall cork material is an extruded cork material that is attached to the top edges of said first sidewall, said front wall, said second sidewall, and said back wall; and
      said top wall is configured with a circular stopper-receiving hole edge defining a stopper-receiving hole having a pre-specified hole diameter; and
   a cork stopper comprising a truncated cone-shaped portion formed of a stopper cork material and comprising a top surface, wherein said cork stopper includes a single side surface and has a top diameter greater than said hole diameter and a bottom diameter less than said hole diameter.

2. The packaging receptacle for liquid contents, as recited in claim 1 wherein said extruded cork material is attached to the top edges of said first sidewall, said front wall, said second sidewall, and said back wall by injection molding.

3. The packaging receptacle for liquid contents, as recited in claim 1, further comprising:
   a membrane attached to said stopper-receiving hole edge and extending inward a sufficient depth to accommodate a lower portion of said cork stopper; and
   an underlayment disposed below said top wall; wherein said membrane and said underlayment are formed of a biodegradable bioplastic material.

4. The packaging receptacle for liquid contents, as recited in claim 3, wherein said biodegradable bioplastic material comprises polylactic acid.

5. The packaging receptacle for liquid contents, as recited in claim 1 wherein at least one layer of said layered paperboard is formed of cork.

6. The packaging receptacle for liquid contents, as recited in claim 1 wherein said cork stopper further comprises an upwardly-protruding crown attached to said top surface of said truncated cone-shaped portion.

7. The packaging receptacle for liquid contents as recited in claim 1 wherein said vertical side seam is coated with one of: a seam compound of a copolymer material and a seam compound of extruded cork.

8. The packaging receptacle for liquid contents, as recited in claim 1 wherein said top wall cork material comprises one of: extruded cork, agglomerated cork, or natural cork.

9. A packaging receptacle for liquid contents comprising:
   a container body having an interior surface and an exterior surface, said container body comprising a bottom wall, a first sidewall, a front wall, a second sidewall, a back wall, and a top wall, wherein:
      said first sidewall, said front wall, said second sidewall, said back wall, and said bottom wall are formed of layered paperboard; wherein said layered paperboard comprises at least an inner and outer layer; and wherein said first sidewall, said front wall, said second sidewall, said back wall, and said bottom wall are formed of a single piece of layered paperboard joined at a vertical side seam and at a bottom seam;
      said top wall is formed of a top wall cork material; and
      said top wall is configured with a circular stopper-receiving hole edge defining a stopper-receiving hole having a pre-specified hole diameter; and a cork stopper comprising a truncated cone-shaped portion formed of a stopper cork material, wherein said cork stopper includes a single side surface and has a top diameter greater than said hole diameter and a bottom diameter less than said hole diameter;

a membrane attached to said stopper-receiving hole edge and extending inward a sufficient depth to accommodate a lower portion of said cork stopper; and a pull tab attached to said membrane.

10. The packaging receptacle for liquid contents, as recited in claim 9 wherein said membrane is scored to cause, upon manual pulling of said pull tab, a portion of said membrane to remain attached to said stopper-receiving hole edge and a portion of said membrane to remain attached to said pull tab for removal.

11. The packaging receptacle for liquid contents, as recited in claim 9 further comprising an underlayment disposed below said top wall; said underlayment not formed of said top wall cork material.

12. The packaging receptacle for liquid contents, as recited in claim 9 further comprising an outer cork band attached to the exterior of said first sidewall, said front wall, said second sidewall, and said back wall.

13. A packaging receptacle for liquid contents, comprising:

a container body having an interior surface and an exterior surface, said container body comprising a bottom wall, a first sidewall, a front wall, a second sidewall, a back wall, a top wall, a membrane with an attached pull tab, and an outer cork band, wherein:

said first sidewall, said front wall, said second sidewall, said back wall, and said bottom wall are formed of a single piece of layered paperboard joined at a vertical side seam and at a bottom seam, wherein said layered paperboard comprises at least an inner and outer layer;

said top wall is formed of a cork material attached to the top edges of said first sidewall, said front wall, said second sidewall, and said back wall;

said top wall is configured with a circular stopper-receiving hole edge defining a stopper-receiving hole having a pre-specified hole diameter;

said membrane is attached to said stopper-receiving hole edge and extends inwardly a sufficient depth to accommodate said cork stopper;

said membrane is scored to cause, upon manually pulling of said pull tab, a portion of said membrane to remain attached to said stopper-receiving hole edge and a portion of said membrane to remain attached to said pull tab for removal; and said outer cork band is attached to the exterior of said first sidewall, said front wall, said second sidewall, and said back wall; and a cork stopper comprising a truncated cone-shaped portion formed of at least one of natural or extruded cork material, wherein:

said cork stopper has a single side surface and has a top diameter and a bottom diameter;

said top diameter is greater than said pre-specified hole diameter;

said bottom diameter is less than said pre-specified hole diameter; and said cork stopper frictionally engages with said membrane at said stopper-receiving hole edge when said cork stopper is placed within said stopper-receiving hole.

14. The packaging receptacle for liquid contents, as recited in claim 13, further comprising:

an underlayment disposed below said top wall; wherein said membrane and said underlayment are formed of a biodegradable bioplastic material.

15. The packaging receptacle for liquid contents, as recited in claim 14, wherein said biodegradable bioplastic material comprises polylactic acid.

\* \* \* \* \*